United States Patent
Simpkinson et al.

(10) Patent No.: US 10,628,982 B2
(45) Date of Patent: Apr. 21, 2020

(54) AUGMENTED REALITY TECHNIQUES

(71) Applicant: Vulcan Inc., Seattle, WA (US)

(72) Inventors: Richard Earl Simpkinson, Issaquah, WA (US); Carlos Miguel Lugtu, Redmond, WA (US); Eric Thomas Smith, Seattle, WA (US)

(73) Assignee: Vulcan Inc., Seattle, WA (US)

( * ) Notice: Subject to any disclaimer, the term of this patent is extended or adjusted under 35 U.S.C. 154(b) by 8 days.

(21) Appl. No.: 15/979,229

(22) Filed: May 14, 2018

(65) Prior Publication Data

US 2020/0027256 A1    Jan. 23, 2020

(51) Int. Cl.
| | |
|---|---|
| *G06T 11/60* | (2006.01) |
| *G06T 19/00* | (2011.01) |
| *G06T 17/00* | (2006.01) |
| *G06T 7/73* | (2017.01) |
| *G06K 9/00* | (2006.01) |
| *G02B 27/01* | (2006.01) |

(52) U.S. Cl.
CPC .......... *G06T 11/60* (2013.01); *G02B 27/0172* (2013.01); *G02B 27/0179* (2013.01); *G06K 9/00664* (2013.01); *G06T 7/73* (2017.01); *G02B 2027/014* (2013.01); *G02B 2027/0138* (2013.01); *G02B 2027/0178* (2013.01); *G02B 2027/0185* (2013.01); *G06T 2207/30204* (2013.01)

(58) Field of Classification Search
CPC .......... G06T 11/60; G06T 19/00; G06T 17/00
See application file for complete search history.

(56) References Cited

U.S. PATENT DOCUMENTS

| | | | |
|---|---|---|---|
| 8,542,906 B1* | 9/2013 | Persson | G06K 9/00671 382/154 |
| 2009/0066725 A1* | 3/2009 | Nogami | A63F 13/10 345/632 |
| 2009/0145328 A1* | 6/2009 | Mirochnik | C07F 5/003 106/31.13 |

(Continued)

OTHER PUBLICATIONS

A.V.A., "ArUco: a minimal library for Augmented Reality applications based on OpenCV," Aplicaciones de la Visión Artificial, retrieved Nov. 23, 2017, http://www.uco.es/investiga/grupos/ava/node/26, 9 pages.

(Continued)

*Primary Examiner* — Yi Yang
(74) *Attorney, Agent, or Firm* — Davis Wright Tremaine LLP

(57) ABSTRACT

A visual characteristic on a physical surface in the physical space is determined from an image of a physical space, with the physical surface including a first area inside the visual characteristic and a second area outside of the visual characteristic. A first region of virtual space that corresponds to the first area and a second region of virtual space that corresponds to the second area is determined based at least in part on the visual characteristic. Information that includes a position and orientation of a digital object relative to the first region and the second region in the virtual space is determined based at least in part on the visual characteristic. The digital object is rendered at a position and orientation in the virtual space in accordance with the information.

21 Claims, 8 Drawing Sheets

(56) References Cited

U.S. PATENT DOCUMENTS

| | | | | |
|---|---|---|---|---|
| 2010/0045869 A1* | 2/2010 | Baseley | ............... | G06T 19/00 |
| | | | | 348/598 |
| 2014/0225919 A1* | 8/2014 | Kaino | ............... | G06T 19/006 |
| | | | | 345/633 |
| 2015/0339471 A1* | 11/2015 | Bennett | ............... | G06F 21/32 |
| | | | | 726/19 |
| 2017/0243403 A1* | 8/2017 | Daniels | ............... | G06F 3/147 |
| 2017/0330025 A1* | 11/2017 | Ono | ............... | G06K 9/209 |

OTHER PUBLICATIONS

Wikipedia, "Microsoft HoloLens," Jan. 21, 2015 (version edited on Nov. 9, 2017) [retrieved Nov. 22, 2017], https://en.wikipedia.org/wiki/Microsoft_HoloLens, 8 pages.

Wikipedia, "Vuforia Augmented Reality SDK," Apr. 30, 2012 (version edited Jun. 4, 2017) [retrieved Nov. 22, 2017], https://en.wikipedia.org/wiki/Vuforia_Augmented_Reality_SDK, 1 page.

* cited by examiner

AUGMENTED REALITY TECHNIQUES

BACKGROUND

The use of immersive augmented reality, where computer-generated objects are superimposed on a view of a real-world environment in real-time to produce an illusion that the computer-generated objects exist in the real-world environment, is growing in popularity. However, anatopistic projection of computer-generated objects into a view of a real-world environment tends to interfere with the immersive effect of the augmented reality, thereby diminishing the intended user experience. Likewise, projecting computer-generated backgrounds or other environmental features into the view of the real-world environment can appear artificial and can similarly impair the immersive effect intended by the augmented reality projection. Moreover, a user's natural field of view often extends beyond the field of view of augmented reality viewing devices, and the lack of background features outside of the devices' field of view that are congruous with the augmented reality projection interferes with the illusion that the augmented reality projection is present in the physical world, thereby further diminishing the intended user experience.

BRIEF DESCRIPTION OF THE DRAWINGS

Various techniques will be described with reference to the drawings, in which.

DETAILED DESCRIPTION

Figure 1:
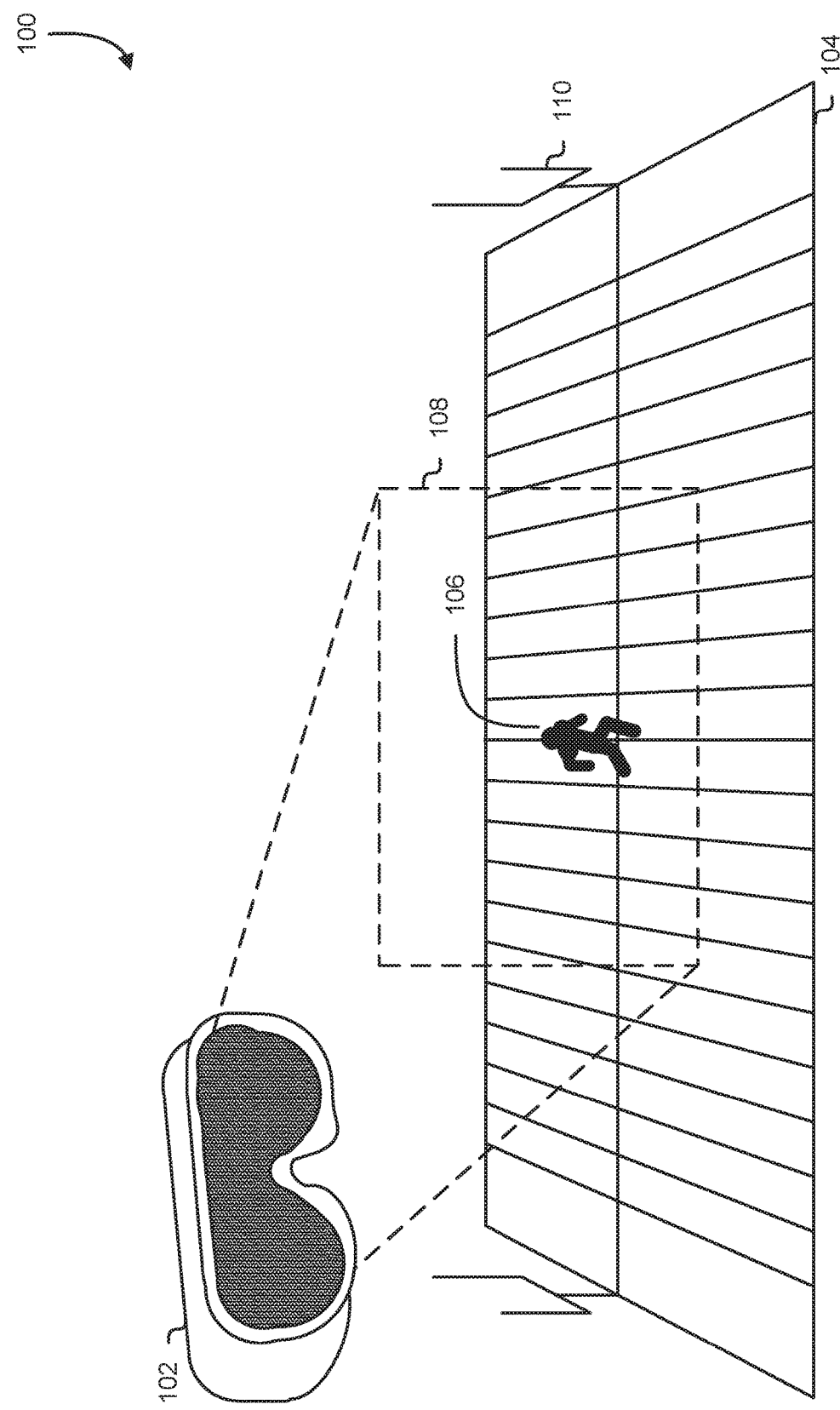
FIG. 1 illustrates an example of an augmented reality mat and a field of view of a display device in accordance with an embodiment.

Techniques and systems described below relate to a physical prop usable to enhance the immersive effect of an augmented reality projection. In one example, an image of a first physical space may be obtained via an image capture device. A visual characteristic in the first physical space associated with a physical mat may be detected within the image, with the physical mat being a representation of a second physical space separate from the first physical space. First information in a virtual space that corresponds to the physical mat may be determined based at least in part on the visual characteristic. Second information may be received, with the second information including a position and orientation of a physical object located in the second physical space. Third information that includes a position and orientation in the virtual space corresponding to the position and orientation of the physical object in the second physical space may be determined based at least in part on the first information and the second information. Finally, a digital object representing the physical object may be rendered via the optical see-through head-mounted display device, with the digital object at least partially occluding a view of the first physical space at a position and orientation in accordance with the third information. In some examples, a system of the present disclosure may comprise an optical see-through head-mounted display device, an image capture device, and memory. In the example, the memory may include executable instructions that, if executed by the one or more processors, cause the system to perform the operations described.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of augmented reality, by allowing for the correlation of spatial dimensions and visual features of a physical prop with special dimensions and physical features of another physical surface such that a digital representation of a physical object interacting with the other physical surface can be made to appear as if it is realistically interacting with the physical prop. Additionally, techniques described and suggested in the present disclosure improve the immersive effect of augmented reality systems by grounding rendered virtual objects in reality that extends beyond the field of view of augmented reality viewing devices. Moreover, techniques described and suggested in the present disclosure are necessarily rooted in computer technology in order to overcome problems specifically arising with the limited field of view of an augmented reality viewing device by utilizing a physical prop with which virtual objects can appear to interact that extends beyond the field of view of the augmented reality viewing device.

FIG. 1 illustrates an example embodiment 100 of the present disclosure. Specifically, FIG. 1 depicts an augmented reality viewing device 102 viewing a digital object 106 as it appears to a user of the augmented reality viewing device 102 to be situated on a physical mat 104 within a field of view 108 of the augmented reality viewing device 102. The augmented reality viewing device 102 may be at least partially transparent and allow light from a source external to a display of the augmented reality viewing device 102. In some examples, the at least partially transparent display may be a window or other at least partially transparent material, an automobile windshield, or a semi-transparent console screen.

In some examples, the augmented reality viewing device 102 is an optical see-through head-mounted display device that has the capability of reflecting projected images as well as allowing a user to at least partially see through it. Examples of optical see-through head-mounted display device include devices such as the Microsoft HoloLens, Google Glass, Epson Moverio, Vuzix m100, Sony SmartEyeglass, Meta 1, Recon Jet, Optinvent Ora-1, and GlassUp. However, it is also contemplated that the techniques described in the present disclosure would also be applicable to non-optical head-mounted displays, smart phones, tablet computers, and other devices usable for viewing augmented reality scenes.

The augmented reality viewing device 102 may have one, two, or more displays for displaying computer-generated imagery that comprises the augmented reality scene. Multiple displays (e.g., at least one for each eye) may allow the augmented reality viewing device 102 to render the digital object 106 in separate, slightly different perspectives so as to give the user of the augmented reality viewing device 102 an impression of the digital object 106 existing in three-dimensions in the vicinity of the physical mat 104. In some embodiments, the augmented reality viewing device 102 displays only computer-generated images (e.g., virtual image), whereas in other embodiments the augmented reality viewing device 102 combines a real world view with computer generated imagery through a partially reflective mirror and viewing the real world directly or by digitally combining the computer-generated imagery with captured images (e.g., digital video) in the augmented reality viewing device 102 display(s).

The augmented reality viewing device 102 may further include an image capture device, such as a charge-coupled device, used for capturing images in the physical space in the vicinity of the augmented reality viewing device 102. The captured images can be received and analyzed by an augmented reality processing system (which may be present within the augmented reality viewing device 102 itself or may be present in a remote system in network communication with the augmented reality viewing device 102) to determine the presence, position, and orientation of the physical mat 104 in the vicinity of the augmented reality viewing device 102.

In some embodiments, the augmented reality processing system determines the presence, position, and orientation of the physical mat 104 by detecting a fiducial marker associated with (e.g., attached to, embedded into, imprinted upon, etc.) the physical mat 104. In other implementations, the augmented reality processing system determines the presence, position, and orientation of the physical mat 104 by recognizing other characteristics of the physical mat 104 usable to identify the physical mat 104 (e.g., combinations of colors, shapes, dimensions, patterns, etc.). In some implementations, the augmented reality processing system is a distributed computing system hosted by a computing resource service provider.

The augmented reality viewing device 102 may further collect information from internal and/or external sensors, such as a gyroscope, accelerometer, gravimeter, tilt sensor, magnetometer, proximity sensor, or barometer. For example, the augmented reality viewing device 102 may control or retrieve data from other instruments or computing devices, such as through a network. Consequently, the augmented reality viewing device 102 may further hardware that supports one or more networking technologies, such as Bluetooth, Wi-Fi, or GPS. The augmented reality viewing device 102 may include a processor, memory, and persistent storage hardware capable of performing the augmented reality processing described in the present disclosure. In some implementations, however, the augmented reality processing may be performed by a separate computing device that transmits data (e.g., coordinates and other data about digital objects to render on the display of the augmented reality viewing device 102) to the augmented reality viewing device 102. The augmented reality viewing device 102 may be capable of receiving and displaying messages or other notifications (e.g., error messages or warnings). Likewise, in some implementations, the augmented reality viewing device 102 is capable of providing audio, such as through a speaker or head/earphone. In some implementations, the augmented reality viewing device 102 may include haptic technology to cause the device to provide physical feedback to the user.

The physical mat 104 may be a physical object with spatial dimensions having a surface upon which is imprinted a visual depiction. In some embodiments, the physical mat 104 is a flat surface. In such embodiments, one or both sides of the physical mat 104 may have a visual depiction (e.g., the physical mat 104 may be flipped over to depict a different visual depiction). In other embodiments, the physical mat 104 may include three-dimensional features 110 (e.g., ramp, goal post, hill, etc.). In still other embodiments, the physical mat 104 may be multi-sided (e.g., a cube with different visual depictions on each of the six sides). Thus, while the term "mat" is used in the present disclosure for the purpose of illustration, the term "mat" is contemplated to refer to any two, three, or four dimensional physical representation of a scene or environment. The reference to "four" dimensions is to reflect that in some embodiments the mat may change or be changed over time (e.g., with the addition or removal of features and various visual characteristics), and the augmented reality overlays (e.g., digital objects) projected over a view of the mat may change accordingly.

In some embodiments, the physical mat 104 is comprised of a rigid material. In some of these embodiments, the physical mat 104 may be creased such that it can be folded or bent. In some embodiments, the physical mat 104 is comprised of a flexible material. In some embodiments, the physical mat 104 may be designed to lie flat, whereas in other embodiments the physical mat 104 may be designed to lie at an angle or be bent, curled, or warped. In some of these embodiments, the physical mat 104 may include one or more visible characteristics (e.g., dots around the edges of the physical mat 104) from which a curvature of the physical mat 104 can be mapped based on an image capture of the physical mat 104.

In some embodiments, the visual depictions on the physical mat 104 are representative depictions of some other real physical surface. For example, the visual depiction of the physical mat 104 of FIG. 1 is a smaller-scale representation of the real physical surface of a football field. Other examples of real physical surfaces include various sporting fields, such as a soccer field, basketball court, tennis court, baseball field, racetrack, marathon course, skating rink, etc. However, it is contemplated that the techniques described in the present disclosure need not be limited to sporting events; for example, the visual depiction may be a road map, map of a geographic region where wildlife is being monitored, map of the ocean, etc.

It is further contemplated, that in some embodiments the visual depiction may be a representation of a physical surface that does not currently exist (e.g., fictional, historical, etc.) in the real world. In some embodiments, the visual depiction is an overhead view of a region. It is contemplated, however, that the visual depiction may be a side view, bottom view, a view from an angle, or some other perspective. In some embodiments, the physical mat 104 is imprinted with a visual characteristic, such as a fiducial marker that identifies (e.g., by corresponding to an identifier in a registry data store) the representation depicted on the physical mat 104.

The digital object 106 may be a digital representation of an object that is depicted to move relative to the representation depicted on the physical mat 104. For example, if the physical mat 104 depicts a football field, the digital object 106 may be a football player, a football, a cheerleader, a flag, or a referee. In some embodiments, the digital object 106 represents, in a virtual space, a position of a real object in a physical space separate from the physical space in which the physical mat 104 is located. That is, in some embodiments the digital object 106 representing a physical object (e.g., football, football player, etc.) is located in a position in a virtual space that is analogous to a position in the physical space at which the physical object is located. Further details can be found in the description of FIG. 3.

In some embodiments, the digital object 106 represents a physical object located in the physical space represented by the physical mat 104. For example, data representing the real-time position of the physical object may be sent (e.g., over a network) to a computing system, such as the augmented reality viewing device 102, and a processor may update the position of the digital object 106 accordingly to reflect an analogous position in virtual space. Thus, other than accounting for lag in the transmission of the data, the digital object 106 may represent the real-time position of the physical object. For example, an entity at the football stadium (such as a third party) may determine the position of the player on the football field and provide that information to the augmented reality processing system (e.g., via a network). In other embodiments, the digital object 106 may represent past positions of the physical object. For example, a series of positions of a football player on a football field may be stored and replayed at a later date using the digital object 106 to represent the football player.

In some embodiments, the digital object 106 may represent an actual physical object, whereas in other embodiments the digital object 106 may represent a fictional physical object. For example, the digital object 106 may represent a fictional football player, fictional race car, a dinosaur, space alien, cartoon character, etc. In embodiments, the digital object 106 may be a rendering of an image of the physical object. In alternate embodiments, the digital object 106 may be a digitally generated (three-dimensional or two-dimensional) model representing the physical object.

The field of view 108 may be an area within the field of view of the user of the device in which digital objects can be rendered. In some embodiments, the field of view 108 of the augmented reality viewing device 102 does not completely encompass the entire field of view of the user. In such a case, digital objects that are outside the field of view 108 of the augmented reality viewing device 102 cannot be seen even if within the field of view of the user of the device. The presence of the physical mat 104, however, being within both the field of view 108 of the augmented reality viewing device 102 and the field of view of the user of the device improves the user experience and the immersive effect of the augmented reality by maintaining visual consistency outside the field of view 108 with the scene inside the field of view 108.

The three-dimensional features 110 may be features associated with the physical mat 104. The three-dimensional features 110 are depicted in FIG. 1 as goal posts attached to the physical mat 104, but it is contemplated that the three-dimensional features 110 may be placed on the physical mat 104, may be adjacent or proximate to the physical mat 104, or disconnected from the physical mat 104. For example, a three-dimensional feature may be a three-dimensional model of bleachers (also known as stands) adjacent to the physical mat 104. In some embodiments, the three-dimensional model includes its own separate fiducial marker from which information (e.g., physical dimensions, position, orientation, etc.) about the there-dimensional model can be derived. For example, in the case of a physical mat 104 representing a motocross track, a three-dimensional feature could include a ramp or obstacle that could be placed on the track. In such an example, the augmented reality viewing device 102 (or augmented reality processing system) would detect the ramp or obstacle and virtual reality motorcycles may be caused by the augmented reality processing system to appear to jump off of the ramp or avoid the obstacle as would be appropriate.

Figure 2:
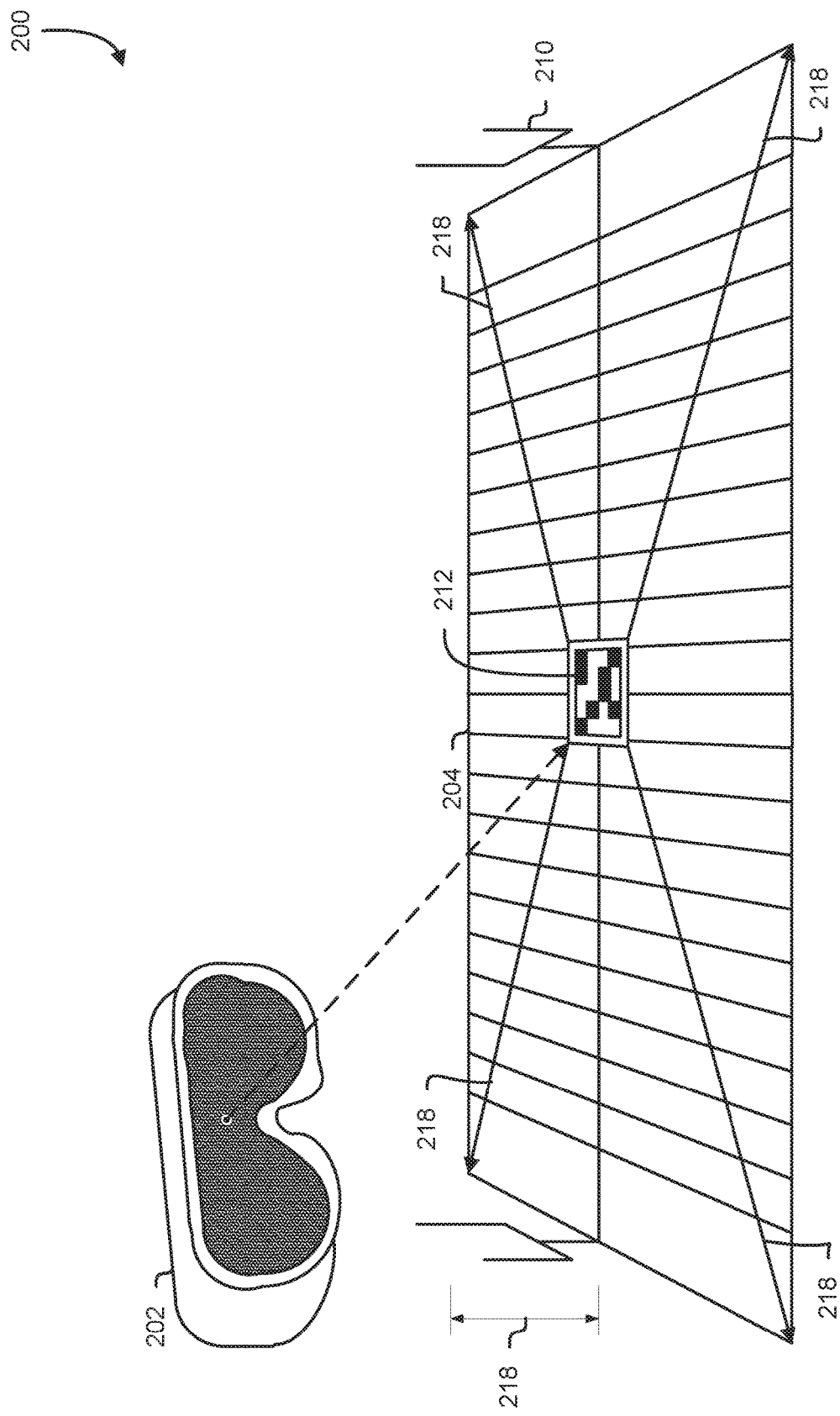
FIG. 2 illustrates an example of detecting a visual characteristic of an augmented reality map in accordance with an embodiment.

FIG. 2 illustrates an aspect of an example embodiment 200 of the present disclosure. Specifically, FIG. 2 depicts an augmented reality viewing device 202 detecting a visual characteristic 212 associated with a physical mat 204 usable to determine dimensions 218 of the physical mat 204 and relative positions for placing digital objects on the physical mat 204. The three-dimensional feature 210 may be similar to the three-dimensional feature 210 of FIG. 1. For example, the three-dimensional feature is illustrated to be a pair of goal posts attached to the physical mat 204 in FIG. 2. The physical mat 204 may be similar to the physical mat 104 described in conjunction with FIG. 1. In the example embodiment 200 shown in FIG. 2, the physical mat 204 includes a visual characteristic 212 recognizable by an augmented reality processing system (not pictured) from an image captured by an image capture device of the augmented reality viewing device 202.

The augmented reality viewing device 202 may be similar to the augmented reality viewing device 102 of FIG. 1. As noted above, the augmented reality viewing device 202 may include a built-in image capture device (or other sensor) capable of detecting presence of the physical mat 204 within the vicinity of the augmented reality viewing device 202. In the example illustrated by FIG. 2, the augmented reality viewing device 202 detects, using an image capture device, the visual characteristic 212 of the physical mat 204.

As noted above, in embodiments the physical mat 204 is imprinted with the visual characteristic 212, such as a fiducial marker that identifies (e.g., by corresponding to an identifier in a registry data store) the representation depicted on the physical mat 204. In certain embodiments, the fiducial marker may be visually conspicuous to the human eye, such as in the form of a sports team logo imprinted on the physical mat 204. In other embodiments, the fiducial marker may blend in with the visual depiction on the physical mat 204 such that the presence of the fiducial marker (e.g., an arrangement of leaves, terrain, variation of colors of vegetation, rocks, sand, etc.) is unlikely to be noticed by a human observer without prior knowledge of the fiducial marker's presence. In still other embodiments, the fiducial marker may be an identifiable arrangement of the terrain itself that identifies the mat. In some embodiments, the fiducial marker may be imprinted, at least partially, with ink that reflects light outside the visible spectrum such that the ink is not visible to the unaided human eye, but is still detectable by a system capable of capturing images of light in the non-visible spectrum. The visible spectrum, in an example, being light with a wavelength between 390 nanometers to 700 nanometers. It is contemplated that various other types of fiducial markers may be used with the embodiments of the present disclosure, such as bar codes, quick response (QR) codes, radio-frequency identification (RFID) tags, holographic image, or arrangements of lights (e.g., light-emitting diodes emitting light inside or outside the visible spectrum).

Detection of the visual characteristic 212 may be performed by an augmented reality processing system using feature detection methods such as corner detection, blob detection, edge detection, thresholding, or other image processing methods. For example, an augmented reality processing system may perform the operations of 604-12 of FIG. 6. In some implementations, the augmented reality viewing device 202 may perform one or more functions of an augmented reality processing system. In other implementations, a computing device (e.g., server) in communication with the augmented reality viewing device 202 performs one or more functions of an augmented reality processing system to reduce the load and hardware requirements of the augmented reality viewing device 202. It is contemplated that, in embodiments, multiple augmented reality viewing devices may be viewing and interacting with the same physical mat 204 simultaneously. The multiple augmented reality viewing devices may be in communication (e.g., via wireless or wired network) with the augmented reality processing system and/or other of the multiple augmented reality viewing devices. In this manner, each of the augmented reality viewing devices may see the digital object rendered in different fields of view and from different perspectives, as determined by the respective augmented reality viewing device's image capture of the visual characteristic 212 of the physical mat 204.

Figure 4:
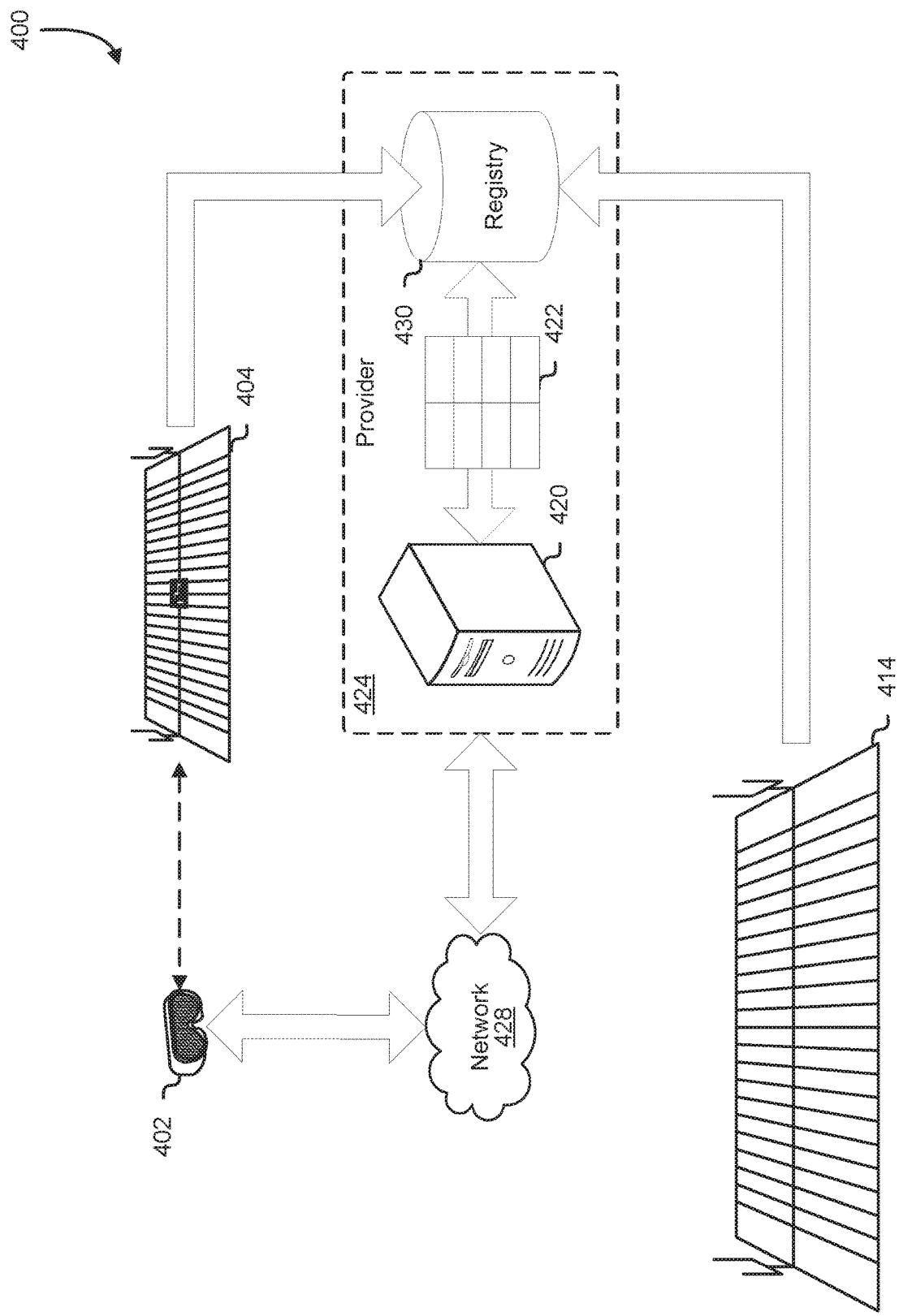
FIG. 4 illustrates an example of registration of an augmented reality mat with a physical space in accordance with an embodiment.

The particular visual characteristic 212 is usable to identify the physical mat 204 from among multiple types of physical mats registered with a service provider, such as the computing resource service provider 424 of FIG. 4. That is, the visual characteristic 212 may be a fiducial marker that identifies the physical mat 204 as being a representation of a particular football field, as opposed to a basketball field, race track, volleyball court, or some other type of physical mat that may be registered with the service provider. In some implementations, the visual characteristic 212 visually encodes (e.g., via a particular arrangement of shapes, lines, colors, etc.) metadata (e.g., serial number) usable to identify the particular physical mat from other physical mats of the same type; in this manner, the physical mat 204 can be associated with and/or registered to a particular user/owner of the physical mat 204. In some embodiments, the visual characteristic 212 additionally or alternatively encodes an identifier usable to look up additional metadata about the physical mat in a registry data store.

In embodiments, the physical mat 204 may be available in multiple sizes or models. For example, a particular football field may be associated with three different sizes of physical mats (e.g., small, medium, and large). In this manner, a physical mat vendor can offer physical mats with different characteristics at different price points. The visual characteristic 212 may visually encode information (metadata) to distinguish the particular size or model of the physical mat 204.

The dimensions 218 that define the length, width, depth, and/or other spatial characteristics of the physical mat 204 may be encoded within or computer from the visual characteristic 212. That is, upon detection of the visual characteristic 212, an augmented reality processing system may determine that, based on the particular visual characteristic 212, the physical mat 204 extends 100 centimeters lengthwise in opposing lengthwise directions from the center of the visual characteristic 212, that the physical mat 204 extends 25 centimeters in opposing widthwise directions from the center of the visual characteristic 212, and the goal posts are 12 centimeters in height from the surface of the physical mat 204. The dimensions 218 may be usable to determine a location of the digital object in virtual space so as to appear, when the digital object is rendered on the display of the augmented reality viewing device 202, to a user of the augmented reality viewing device to be located at that particular location on the physical mat 204.

The spatial dimensions 218 of the physical mat 204 may be correlated to spatial dimensions of the other physical surface that the physical mat represents. In this manner, digital object can be positioned in a virtual space such that the digital object appears to a user of the augmented reality viewing device 202 to interact with the physical mat 204 in the manner of a physical object interacting with the other physical surface. For example, yard lines imprinted on a physical mat representing a football field may be correlated to equivalent yard lines on the actual football field. Thus, even if the field of view of the augmented reality viewing device 202 (e.g., the field of view 108 of FIG. 108) is unable to accommodate the entire physical mat at once, because the visible features (e.g., yard lines) of the physical mat 204 extend outside the field of view of the augmented reality viewing device 202, the user of the augmented reality viewing device 202 is given the impression of an expanded field of view, thereby enhancing the immersive experience of the augmented reality.

Figure 3:
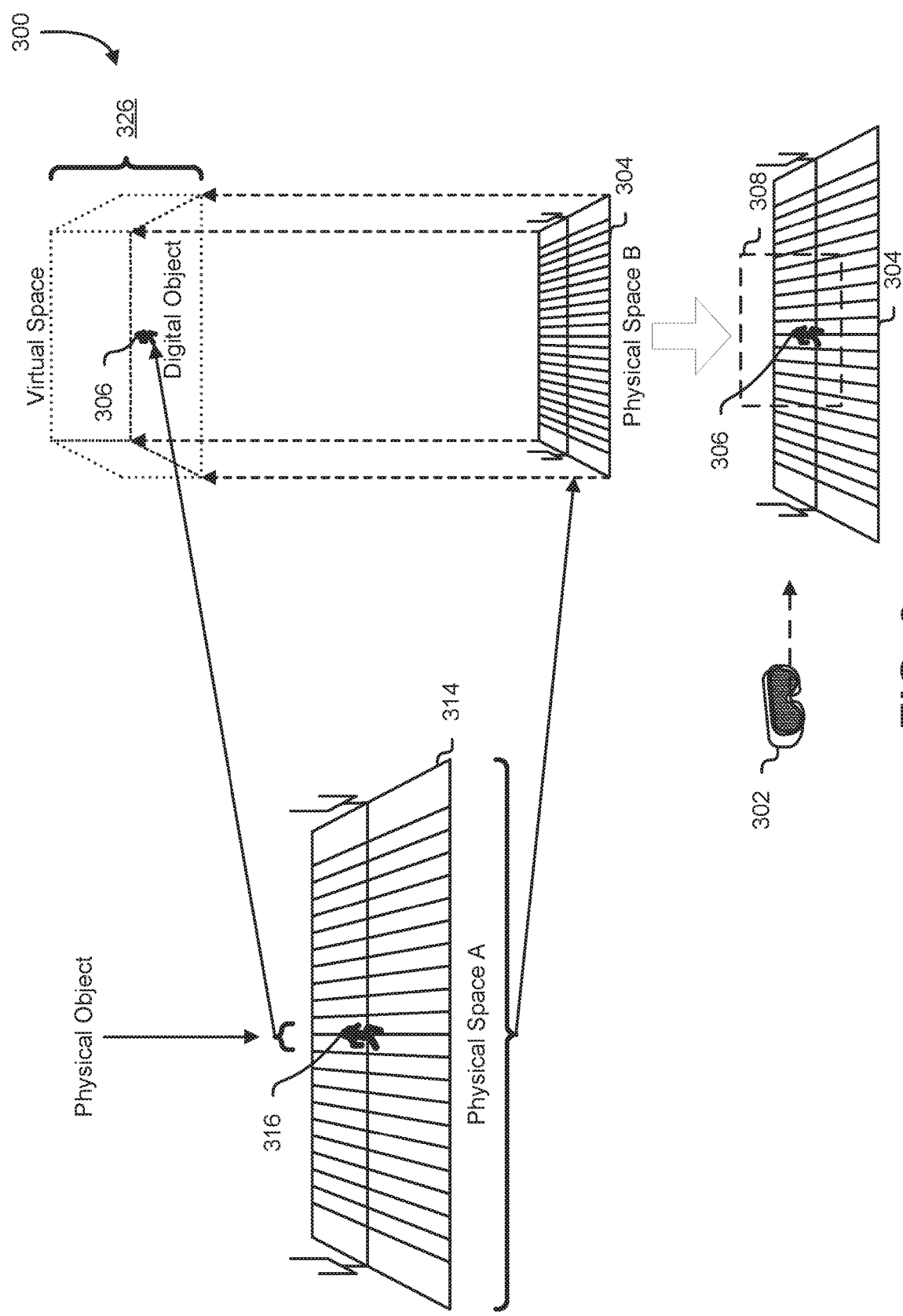
FIG. 3 illustrates an example of a combining physical spaces with a virtual space in accordance with an embodiment.

FIG. 3 illustrates an example embodiment 300 of the present disclosure/etc. Specifically, FIG. 3 depicts an augmented reality viewing device 302 viewing a digital object 306 in a field of view 308 on a physical mat 304 in one physical space, where the digital object 306 exists in a virtual space 326 and corresponds to a physical object 316 in another physical space, and the physical mat 304 corresponds to another physical surface 314 in the other physical space.

In the embodiment depicted in FIG. 1, the physical mat 304 is located in physical space B and is similar to the physical mat 104 of FIG. 1. The physical mat 304 corresponds to the other physical surface 314 (e.g., an actual football field) located in physical space A, which is separate from physical space B. For example, the physical space B may be located in a room of a home many miles away from the physical space A that contains the other physical surface 314. Thus, other physical surface 314 may be an actual physical surface (e.g., sports field, track, terrain, map, etc.) represented by the physical mat 304.

In embodiments, the digital object 306 may be similar to the digital object 106 of FIG. 1 and may correspond to the physical object 316. The physical object 316 may be an object, not represented by or on the physical mat 304, but located on or near the other physical surface 314. In the example embodiment, the physical object 316 is an actual football player on the other physical surface 314 (football field in this illustrative example), and the digital object 306 is a virtual representation of the football player.

In embodiments, the virtual space 326 is a two-dimensional or three-dimensional coordinate system created using data about the physical mat 304. For example, an augmented reality processing system, via an image capture device of the augmented reality viewing device 302, may detect a visual characteristic (e.g., a fiducial marker) from an image of the physical mat 304 captured by the image capture device as described in conjunction with FIG. 2. The visual characteristic may include information about the geometry of the physical mat 304, and using such information, may construct the virtual space 326 to overlay, in a display of the augmented reality viewing device 302, the physical space defined by the edges of the physical mat 304. Thus, the virtual space 326 may be a two-dimensional region that spans the length and width of the physical mat 304, or may be a three-dimensional volume adjacent or proximate to the surface of the physical mat 304 that spans the length of the physical mat 304 as well as spanning a predetermined height (e.g., to fully include a football kicked in the air, to include three dimensional features of the physical mat 304, such as goal posts, hills, etc.). The digital object may be renendered in the display of the augmented reality viewing device such that it at least partially occlude a view of the physical space. In this manner, digital objects located within the virtual space 326 can be rendered in the display of the augmented reality viewing device 302 to appear to a human user of the augmented reality viewing device 302 as if they are colocated with the physical mat 304. Note that in the present disclosure, occlusion can mean a physical object blocking a digital object or at least partial non-rendering of a digital object such that the physical object appears to a human user to be in front of the digital object. However, the present disclosure also contemplates that occlusion can include projection of a virtual object to overlay a view of a physical object in such a way that the view of the physical object is less visible, is less distinct, or is at least partially obscured by the digital object. For example, a view of a physical black chair with a a white cup rendered to overlay the view would at least partially occlude the black chair.

The augmented reality viewing device 302 may be similar to the augmented reality viewing device 102 and the field of view 308 may be similar to the field of view 108 described in conjunction with FIG. 1. As can be seen, to the user of the augmented reality viewing device 302, the digital object 306 representing the physical object 316 in the virtual space 326 is rendered in the display of the augmented reality viewing device 302 in the field of view 308 such that it appears in a location relative to the physical mat 304 equivalent to the location of the physical object 316 relative to the other physical surface 314 (e.g., to at least partially occlude a view of the physical mat).

FIG. 4 illustrates an aspect of an environment 400 in which an embodiment may be practiced. As illustrated in FIG. 4, the environment 400 may include a computing resource service provider 424 that provides a registry service that maps (e.g., via a mapping table 422) one or more physical characteristics of a physical mat 404 two corresponding physical characteristics of another physical surface 414. The computing resource service provider 424 may include a server 420 and a registry data store 430 storing the mapping table 422. An augmented reality viewing device 402 may detect a visual characteristic of the physical mat 404, and send data about the visual characteristic through a network 428 to the server 420 of the computing resource service provider 424, which may then perform a lookup in the registry data store 430 to find the mapping 422 associated with the other physical surface 414.

The augmented reality viewing device 402 may be similar to the augmented reality viewing device 102 described in conjunction with FIG. 1. Likewise, the physical mat 404 may be similar to the physical mat 104 and the physical mat 204 described in conjunction with FIGS. 1 and 2. The other physical surface 414 may be similar to the other physical surface 314 described in conjunction with FIG. 3.

The computing resource service provider 424 may be an entity that hosts one or more computing resources, applications, data storage, or other computing resource on the behalf of a customer of the computing resource service provider 424. The computing resource service provider 424 may provide a computing resource service to a customer individually or as a combination of services of a distributed computer system. Examples of types of computing resources provided by the computing resource service providers include Infrastructure-as-a-service (IaaS), platform-as-a-service (PaaS), and/or software-as-a-service (SaaS).

The service provided by a computing resource service provider 424 may have an interface (e.g., a web service interface, graphical user interface, remote procedure call interface, or any other suitable interface) through which entities and/or devices such as the augmented reality viewing device 402 may communicate with the service of the computing resource service provider 424. The service of the computing resource service provider 424 may be accessible (e.g., via the interface) to entities, such as users, via the network 428. The network 428 may represent a path of communication between the augmented reality viewing device 402 and the computing resource service provider 424. Examples of the network 428 include the Internet, a local area network, a wide area network and Wi-Fi.

The mapping table 422 may be a set of data, such as one or more database tables, that stores information about the physical mat 404. The set of data may include data that defines the relationships between characteristics of the physical mat 404 and characteristics of the other physical surface 414. For example, the set of data could include a ratio between the size of the other physical surface 414 and the size of the physical mat 404. In this manner, the location of the digital object in the virtual space relative to the physical mat 404 can be determined based on the location of the physical object in relation to the other physical surface 414.

Figure 8:
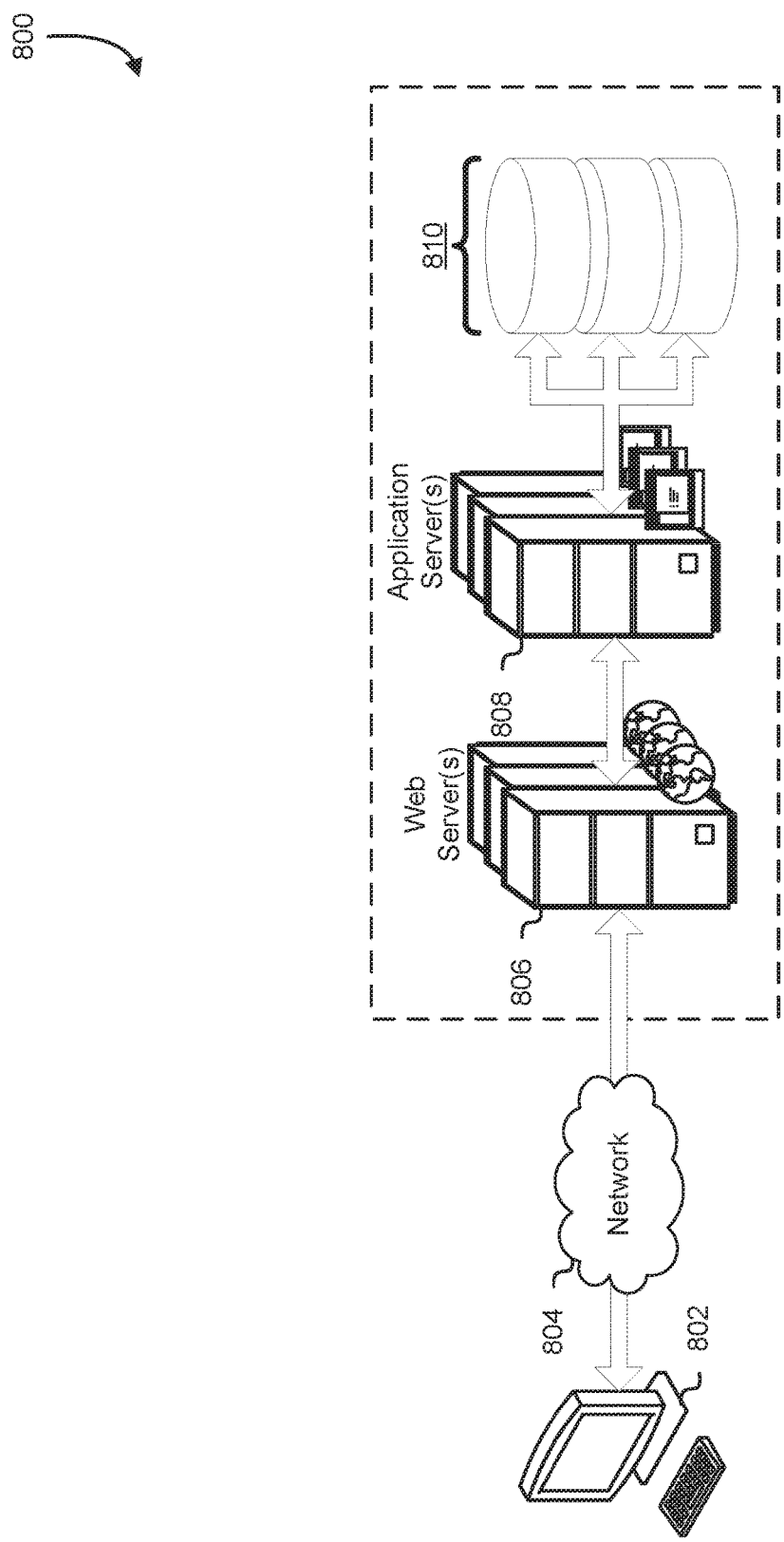
FIG. 8 illustrates an environment in which various embodiments can be implemented.

The server 420 may be a server similar to the one or more web servers 806 or the one or more application servers 808 of FIG. 8. The registry data store 430 may be data storage similar to the data storage 810 of FIG. 8. FIG. 4 is illustrated to depict how details about the other physical surface 414 are stored (e.g., via the mapping table 422) in the registry data store 430 in connection with details about the physical mat 404, such as an identifier associated with the visual characteristic on the physical mat 404. In this manner, the visual characteristic can be recognized from an image captured by the augmented reality viewing device 402 (or augmented reality processing system), which can communicate a request, including data derived from the visual characteristic, through the network 428 to the computing resource service provider 424 for data corresponding to the detected visual characteristic. In some embodiments, the registry data store 430 is located with and maintained by a third party entity.

The registry data store 430 may include metadata about a plurality of physical mats, or at least about a plurality of physical mat types (e.g., models and/or sizes). The physical mats in the registry data store 430 may be indexed by an identifier that is identifiable using data derived from the visual characteristic of the physical mat. The computing resource service provider 424 may perform a lookup of the visual characteristic in the registry data store 430 and determine that the visual characteristic corresponds to the physical mat 404 from among a plurality of physical mats, and further determine that the physical mat 404 represents the other physical surface 414. The computing resource service provider 424 can respond to the augmented reality viewing device 402 (or augmented reality processing system) with data about the physical mat 404 (e.g., dimensions, etc.) and/or data about the other physical surface 414. Thereafter, as the augmented reality viewing device 402 (or augmented reality processing system) receives position and orientation data of physical objects in the vicinity of the other physical surface 414, the augmented reality viewing device 402 can render digital objects representing the physical objects to appear to a user of the augmented reality viewing device 402 in an equivalent position and orientation on the physical mat 404 (e.g., to at least partially occlude a view of the physical mat 404).

In some examples, "position" refers to a spatial location of an object in a space. Position may be expressed in various ways depending on a particular implementation. For example, a position may be represented by (x, y, z) coordinates in a Cartesian coordinate system, a position vector, (r, θ, φ) coordinates in a spherical coordinate system, or (ρ, φ, z) in a cylindrical coordinate system. In some examples "orientation" refers to the angular position (also known as "attitude") of an object in a space. For example, an orientation of an object may be comprised of Miller indices or of variables representing a roll, pitch, and yaw of the object.

Figure 5:
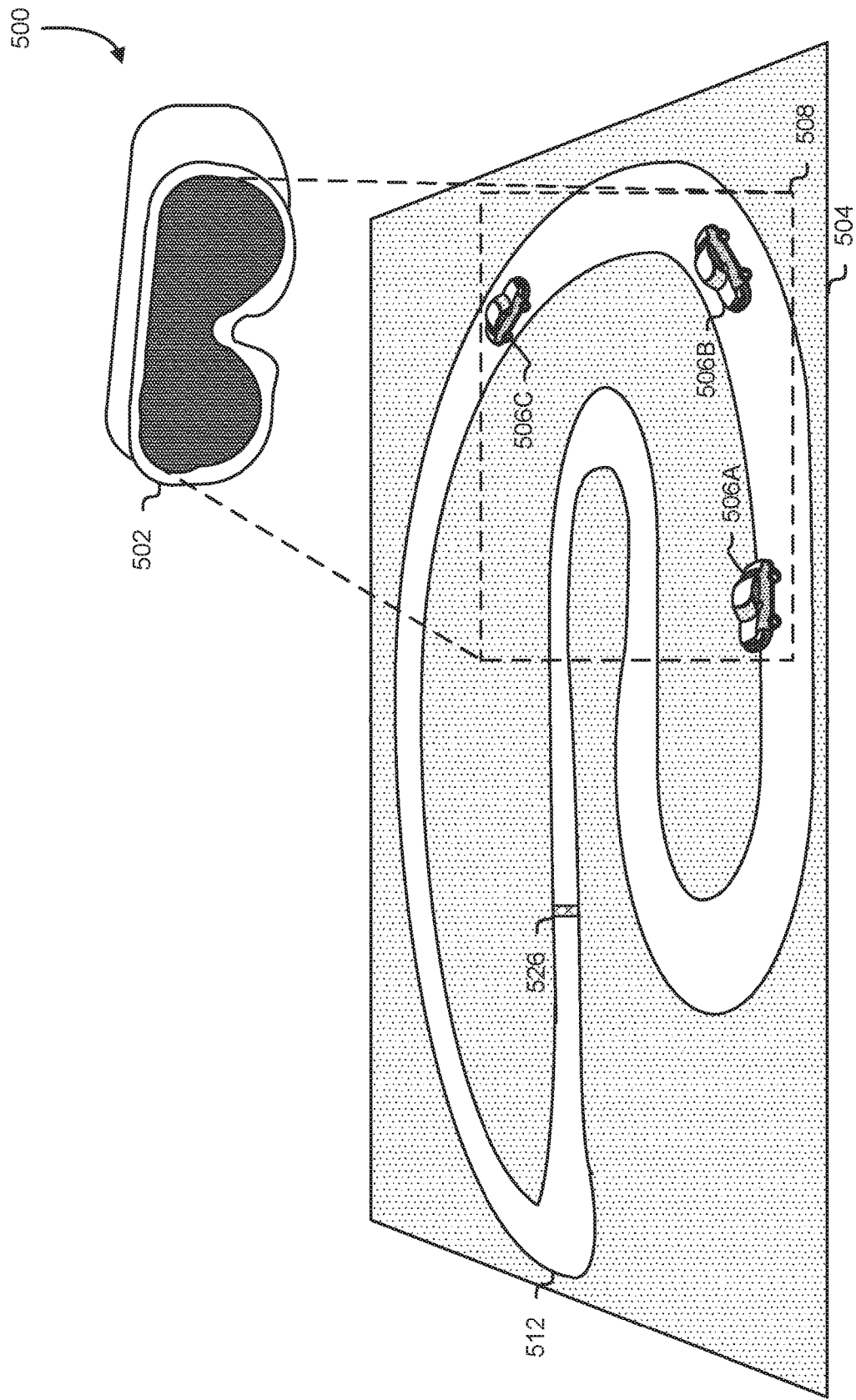
FIG. 5 illustrates another example of at augmented reality mat in accordance with an embodiment.

FIG. 5 illustrates another example embodiment 500 of the present disclosure. Specifically, FIG. 5 depicts an augmented reality viewing device 502 with the field of view 508 of a visual characteristic 512 on a physical mat 504 in the shape of a race track. The example embodiment 500 further depicts a set of digital objects 506 rendered as racecars racing around the physical mat 504.

The augmented reality viewing device 502 may be similar to the augmented reality viewing device 102 and the field of view 508 may be similar to the field of view 108 described in conjunction with FIG. 1. The physical mat 504 may, like the physical mat 104 of FIG. 1, be a physical object with spatial dimension having a surface upon which is imprinted a visual characteristic 512. In the example embodiment 500, the visual characteristic 512 is that of an automobile racetrack with a start/finish line 526. Within the field of view 508 of the augmented reality viewing device 502 is rendered three digital objects 506A-06C. Each of the set of digital objects 506A-06C, like the digital object 106 of FIG. 1, may be a digital representation in a virtual space of a physical object. In the example embodiment 500, the digital objects 506A-06C are illustrated to be virtual cars racing around the racetrack.

As noted, in some embodiments, the digital objects 506A-06C represent physical objects in the real world. For example, the digital objects 506A-06C may represent actual racing cars that compete in races on physical tracks. In some implementations, the racing cars may follow paths around the track in the manner that their physical counterparts followed around the physical track equivalent of the physical mat 504. In some of these implementations, the racing cars' positions may be updated with the real-time positions of their physical counterparts, whereas in other implementations the racing cars' positions may be updated to replay a past race by the racing cars. In some implementations, the digital objects 506A-06C may represent actual racing cars in the physical world, but the path of motion they follow may be simulated or derived from feedback of a user. For example, each racing car could be selected by a player in a racing game, with the race car having various characteristics based on its physical counterpart, and the player could simulate driving the racing car around the physical mat 504.

In embodiments, the augmented reality viewing device 502 captures an image of the physical mat 504 and the augmented reality processing system detects the visual characteristic 512 from the image, assigning spatial significance to the physical features of the visual characteristic 512. The assigned spatial significance may be caused to affect how the digital objects interact with the physical mat 504. For example, the augmented reality processing system may distinguish the edges/borders of the visual characteristic 512 (e.g., the race track) and ensure that the digital objects 506A-06C are only rendered to appear to a user of the augmented reality viewing device 502 to be within the borders of the visual characteristic 512. As another example, the augmented reality processing system may distinguish the area within the visual characteristic 512 and the areas of the physical mat 504 that are outside the visual characteristic 512 such that digital objects within the virtual space corresponding to the visual characteristic 512 behave in one way (e.g., steer smoothly so as to simulate a paved road, etc.) whereas digital objects outside the virtual space corresponding to the visual characteristic 512 behave in another way (e.g., are caused to "crash" or drive erratically so as to simulate unpaved terrain). In some embodiments, the regions in the virtual space corresponding to the areas of the physical mat 504 inside and outside the visual characteristic 512 are two-dimensional regions. In other embodiments, the regions in the virtual space corresponding to the areas of the physical mat 504 inside and outside the visual characteristic 512 are three-dimensional volumes; for example, the regions may extend from the surface of the visual mat to a threshold height.

In a similar manner, in some embodiments the physical mat 504 is a representation of a physical surface in the real world. However, in other embodiments, the physical mat 504 is not an analog to any particular real-world physical surface. That is, the racetrack visually depicted on the physical mat 504 may be a fictional racetrack. In such embodiments, the fictional racetrack could be used by players to race virtual racecars (e.g., the digital objects 506A-06C) around the physical mat 504. Further, the physical mat 504 may be modular such that additional physical objects and/or surfaces may be placed in the vicinity of the physical mat 504 to affect the motion and behavior of the digital objects 506A-06C. For example, ramps could be placed on the physical mat 504 to allow or cause the digital objects 506A-06C to "jump." Additional physical mats could be placed side-by-side in order to extend the track, and so on.

In an embodiment, the physical mat 504 is comprised of multiple pieces that can be arranged to form the visual characteristic 512. For example, the physical mat 504 may be a puzzle (e.g., jigsaw puzzle) that, upon successful arrangement of the pieces, the augmented reality processing system detects the visual characteristic 512 and displays an augmented reality effect to the user of the augmented reality viewing device 502. In another example, the pieces of the physical mat 504 are portions of a race track such that various race track layouts can be created depending upon the arrangement of the pieces of the physical mat 504 in relation to each other. The augmented reality processing system in such an example may detect the visual characteristic 512 of the arrangement of the race track and cause the digital objects 506A-06C to follow the track according to the particular arrangement.

In some embodiments, multiple physical mats can be used for multiple users to participate in the same event in different locations. For example, a first user could have a first physical map in a first geographical location watching a sporting event as it is played out in augmented reality through the first user's augmented reality viewing device simultaneously a second user could view the same sporting event on a second physical map in a second geographical location. In this manner, multiple users may be enabled to play or view the same augmented reality event even though they are remotely located from each other (e.g., in different geographical locations, different rooms, etc.). These techniques may be applied to various types of games (e.g., board games, role-playing games, real-time strategy games, etc.) or viewing events (e.g., viewing real-time traffic on a street map, viewing a sporting event, viewing a simulation, etc.).

Figure 6:
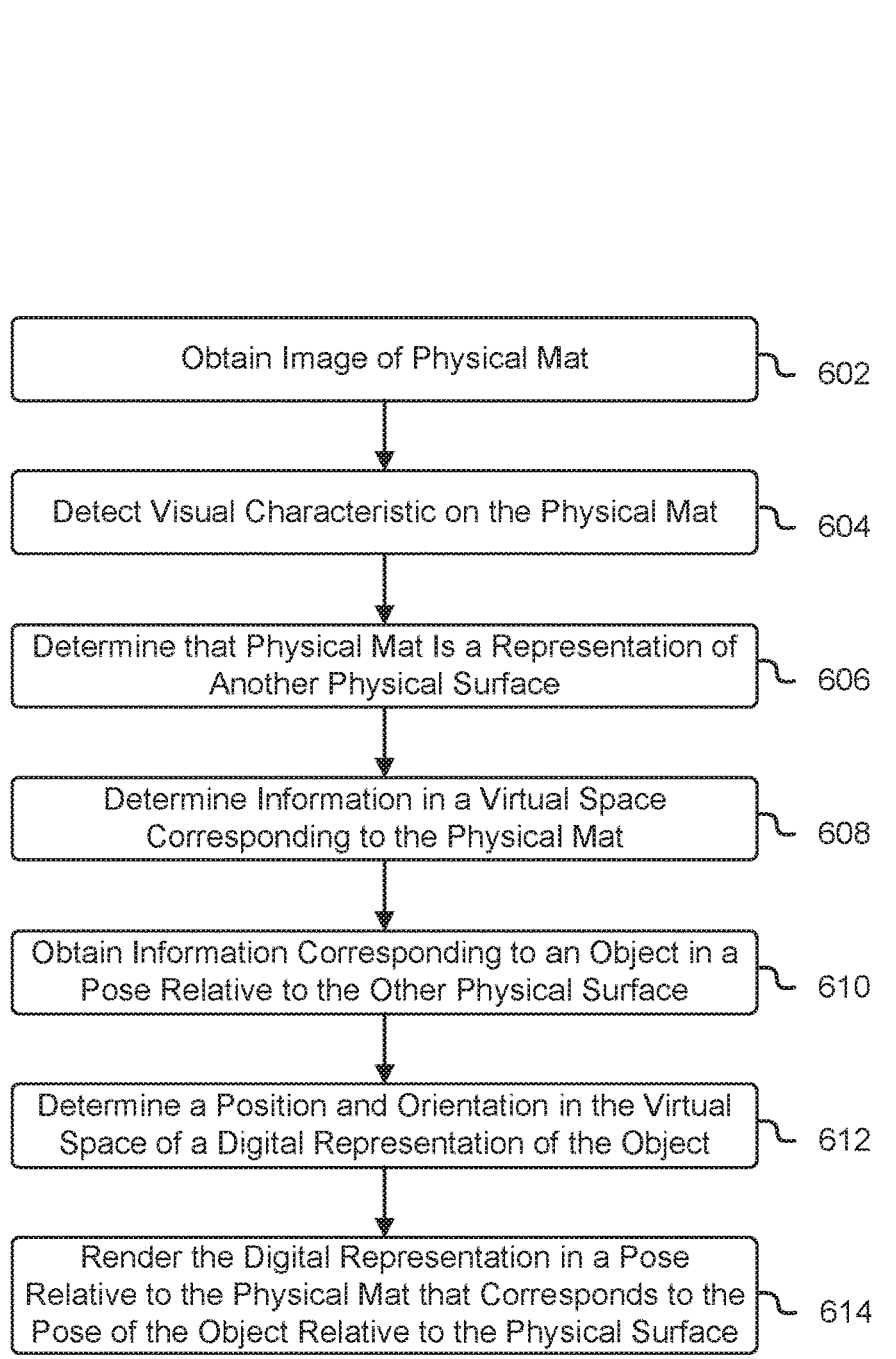
FIG. 6 is a flowchart that illustrates an example of implementing an augmented reality mat in accordance with an embodiment.

FIG. 6 is a flowchart illustrating an example of a process 600 for displaying augmented reality with a physical mat in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 600 may be performed by any suitable system, such as a server in a data center, by various components of the environment 800 described in conjunction with FIG. 8, such as the one or more web servers 806 or the one or more application servers 808, by multiple computing devices in a distributed system of a computing resource service provider, or by any electronic client device such as the electronic client device 802 or the augmented reality viewing device 102 of FIG. 1. The process 600 includes a series of operations wherein an image of the physical mat is captured, a visual characteristic of the physical mat is detected and identified to determine that the physical mat corresponds to another physical surface, and a virtual space is created to represent real-world coordinates in the proximity of the physical mat. The process 600 further includes obtaining information that corresponds to a position and/or orientation of an object relative to the other physical surface, determining the analogous position and/or orientation in the virtual space, and rendering the digital object on an augmented reality viewing device display such that it appears to a user of the augmented reality viewing device to be located in the same position and/or orientation to the physical mat as the physical object is to the other physical surface.

In 602, the system performing the process 600 obtains an image of a physical mat. In some embodiments, the image of the physical mat is obtained via an image capture device incorporated into an augmented reality viewing device. In some implementations, the image may be captured by an image capture device separate from the augmented reality viewing device, such as by a fixed camera in a room in which the physical mat is located.

In 604, the system performing the process 600 detects a visual characteristic of the physical mat, such as a fiducial marker, in the image. The system may determine the position and orientation of the visual characteristic based on the size and proportions of the visual characteristic within the captured image. In this manner, the system may determine the position and orientation of the physical mat. Further, based on information visually encoded in the visual characteristic, the system may determine the dimensions of the physical mat in relation to the visual characteristic. In some implementations, the system may determine the information strictly from the information visually encoded in the visual characteristic (e.g., based on an arrangement of blocks or lines within the visual characteristic). In other embodiments, the system may determine the information by matching the visual characteristic to an entry in a registry data store that stores the information. It is contemplated, however, that not all implementations of the physical mat include a visual characteristic. For example, the physical mat may incorporate an RFID tag into its construction from which similar data can be obtained or derived.

In 606, the system performing the process 600 matches the detected visual characteristic with stored data, such as by finding an identifier associated with the visual characteristic in a mapping table similar to the mapping table 422 of FIG. 4, to determine that the physical mat is a representation of another physical surface. For example, given a pattern of the visual characteristic, the system may determine that the pattern indicates that the physical mat corresponds to a real-world football field.

In 608, the system performing the process 600 determines a first set of information such as the position, orientation, and spatial dimensions of the physical mat at least in part based on the detected visual characteristic. Based on the first set of information, the system creates a visual space coordinate system to overlay the view of the physical mat through the augmented reality viewing device.

In 610, the system performing the process 600 obtains a second set of information about an object in the vicinity of the other physical surface, such as position and orientation of the object in relation to a characteristic of the other physical surface (e.g., location and orientation of a football player relative to the center of a football field). As noted, in some embodiments the object may be an actual physical object currently located at the position and orientation relative to the other physical surface. In other implementations, the set of information is information (e.g., pre-recorded) about past position and orientation of the object concerning the other physical surface, but the object itself may no longer be in the vicinity of the other physical surface (e.g., the football player went home after the game). In still other implementations, the set of information is information about a fictional object in relation to the other physical surface (e.g., while the physical mat may be a representation of the other physical surface, the user of the augmented reality viewing device may be playing a fantasy football game using the physical mat; consequently, the positions and orientations of the digital objects may be simulated).

In 612, the system performing the process 600 determines a position and orientation of the digital object in the virtual space that would be analogous/equivalent to the position and orientation of the object in the physical space of the other physical surface. Subsequently, in 614, the system performing the process 600 causes the digital object to be rendered in the field of view of the augmented reality viewing device such that the digital object appears to a user of the augmented reality viewing device to be overlaid relative to the physical mat in the same position and orientation as the object is or would be relative to the other physical surface. Note that one or more of the operations performed in 602-14 may be performed in various orders and combinations, including in parallel.

Figure 7:
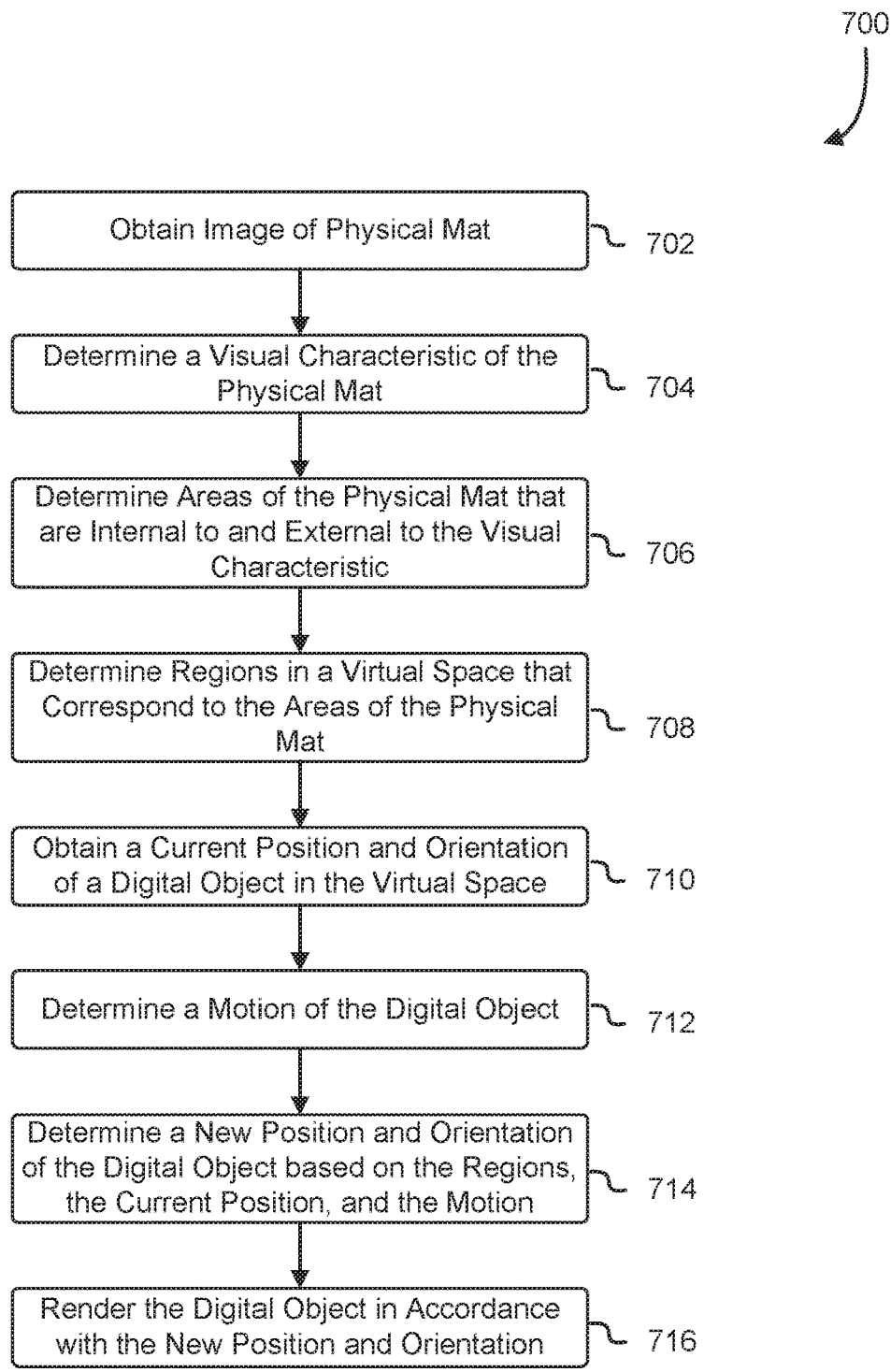
FIG. 7 is a flowchart that illustrates another example of implementing an augmented reality mat in accordance with an embodiment.

FIG. 7 is a flowchart illustrating another example of a process 700 for displaying augmented reality with a physical mat in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by any suitable system, such as a server in a data center, by various components of the environment 800 described in conjunction with FIG. 8, such as the one or more web servers 806 or the one or more application servers 808, by multiple computing devices in a distributed system of a computing resource service provider, or by any electronic client device such as the electronic client device 802 or the augmented reality viewing device 102 of FIG. 1. The process 700 includes a series of operations wherein an image of the physical mat is captured, a visual characteristic of the physical mat is detected and identified to determine areas of the physical mat that are internal to and external to the visual characteristic, and regions in a virtual space are determined to correspond to the internal and external areas on the physical mat. The process 700 further includes determining, based on a previous position of a digital object in the virtual space and motion associated with the digital object (e.g., projected change in a position of the digital object over time), whether the motion places the digital object within a region in the virtual space corresponding to the internal area on the physical mat or a region in the virtual space corresponding to the external area on the physical mat, which may affect a subsequent position, orientation, or visual appearance of the rendered digital object.

In 702, the system performing the process 700 obtains an image of the physical mat. In some embodiments, the image of the physical mat is obtained via an image capture device incorporated into an augmented reality viewing device. In some implementations, the image may be captured by an image capture device separate from the augmented reality viewing device, such as a fixed camera.

In 704, the system performing the process 700 detect a visual characteristic of the physical mat, such as the race track comprising the visual characteristic 512 of FIG. 5 or some other physical characteristic visually depicting regions or borders within the physical mat. The system may determine the position and orientation based on the size and proportions of the visual characteristic within the captured image. In this manner, the system may determine the position and orientation of the physical mat. In some implementations, the physical mat may include a second visual characteristic, such as a fiducial marker, usable to identify the particular physical mat and/or the dimensions of the physical mat in relation to the visual characteristic. The second visual characteristic may encode additional metadata about the particular physical mat.

In 706, the system performing the process 700 identifies areas on the physical mat that correspond to regions on the physical mat defined by the visual characteristic. For example, the system may determine which areas on the physical mat lie within the visual characteristic and which areas on the physical mat lie outside of the visual characteristic.

In 708, the system performing the process 700 creates a virtual space to virtually overlay the physical mat in the view of the augmented reality viewing device. Further, the system performing the process may designate regions in the virtual space that correspond to areas within the borders of the visual characteristic (e.g., a track) and regions that correspond to areas outside the borders of the visual characteristic.

In 710, the system performing the process 700 determines a current position and orientation of a digital object in the virtual space, and in 712, the system determines a motion (e.g., direction, speed, velocity, etc.) associated with the digital object. In embodiments, the current position, orientation, and motion of the digital object may be influenced by the visual characteristic. For example, in the example embodiment 500 of FIG. 5, the system may detect the visual characteristic of the start/finish line 526 and initially place the digital objects 506A-06C to have a position immediately behind the start/finish line 526 and oriented to face in the direction the race is to be run.

In 714, the system determines, based on the current position and orientation, a next position and orientation of the digital object. Depending on whether the next position and orientation places the digital object inside or outside the region of virtual space corresponding to the area inside or outside the visual characteristic the next position, orientation, and motion may be adjusted. As an example, given the example embodiment 500 of the race track, if the motion would result in a car leaving the track, the next position, orientation, and motion may be modified such that the car "bumps" into the edge of the track, slowing down but remaining within the track. Using example embodiment 500 in another example, a car leaving the track may be caused to cease moving or spin around (e.g., a crash), slow down (e.g., reflecting rougher terrain), or change vertical position (e.g., fly into the air). Conversely, such a car re-entering the region of virtual space representing the track may increase in motion. Or, in the event the system detects that the car would cross the finish line, the car may be caused to slow down and stop in the virtual space. In this manner, the behavior of digital objects in the virtual space can be tied to a visual depiction on the physical mat.

In 716, the digital object is rendered in the view of the augmented reality viewing device in accordance with the new/next position and orientation such that it appears to be inside or outside the visual characteristic of the physical mat in accordance. Note that one or more of the operations performed in 702-16 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 8 illustrates aspects of an example of an environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 800 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 8. Thus, the depiction in FIG. 8 should be taken as being illustrative in nature and not limiting to the scope of the disclosure.

The network 804 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 804 are well known and will not be discussed in detail. Communication over the network 804 can be enabled by wired or wireless connections and combinations thereof. In an embodiment, the network 804 includes the Internet and/or other publicly-addressable communications network, as the environment 800 includes one or more web servers 806 for receiving requests and serving content in response thereto, although for other networks an alternative device serving a similar purpose could be used as would be apparent to one of ordinary skill in the art.

The illustrative environment 800 includes one or more application servers 808 and data storage 810. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 808 can include any appropriate hardware, software and firmware for integrating with the data storage 810 as needed to execute aspects of one or more applications for the electronic client device 802, handling some or all of the data access and business logic for an application. The one or more application servers 808 may provide access control services in cooperation with the data storage 810 and is able to generate content including, text, graphics, audio, video, and/or other content usable to be provided to the user, which may be served to the user by the one or more web servers 806 in the form of HyperText Markup Language (HTML), Extensible Markup Language (XML), JavaScript, Cascading Style Sheets (CSS), JavaScript Object Notation (JSON), and/or another appropriate client-side structured language. Content transferred to the electronic client device 802 may be processed by the electronic client device 802 to provide the content in one or more forms including forms that are perceptible to the user audibly, visually, and/or through other senses. The handling of all requests and responses, as well as the delivery of content between the electronic client device 802 and the one or more application servers 808, can be handled by the one or more web servers 806 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 810 can include several separate data tables, databases, data documents, dynamic data storage schemes, and/or other data storage mechanisms and media for storing data relating to a particular aspect of the present disclosure. For example, the data storage 810 may include mechanisms for storing various types of data and user information 816, which can be used to serve content to the electronic client device 802. The data storage 810 also is shown to include a mechanism for storing log data, such as application logs, system logs, access logs, and/or various other event logs, which can be used for reporting, analysis, or other purposes. It should be understood that there can be many other aspects that may need to be stored in the data storage 810, such as page image information and access rights information, which can be stored in any of the above listed mechanisms as appropriate or in additional mechanisms in the data storage 810. The data storage 810 is operable, through logic associated therewith, to receive instructions from the one or more application servers 808 and obtain, update, or otherwise process data in response thereto. The one or more application servers 808 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 808.

In one embodiment, a user, through a device operated by the user, can submit a search request for a match to a particular search term. In this embodiment, the data storage 810 might access the user information to verify the identity of the user and obtain information about items of that type. The information can then be returned to the user, such as in a results listing on a web page that the user is able to view via a browser on the electronic client device 802. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 804. These devices also can include virtual devices such as virtual machines, hypervisors, and other virtual devices capable of communicating via the network 804.

Various embodiments of the present disclosure utilize the network 804 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 804 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 806, the one or more web servers 806 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 800 can include a variety of data stores and other memory and storage media as discussed above. These can reside in a variety of locations, such as on a storage medium local to (and/or resident in) one or more of the computers or remote from any or all of the computers across the network 804. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system, comprising:
    an optical see-through display device;
    an image capture device; and
    memory including executable instructions that, if executed by one or more processors, cause the system to:
        obtain, via the image capture device, an image of a first physical space;
        detect, within the image, a visual characteristic in the first physical space associated with a physical mat, the physical mat being a representation of a second physical space separate from the first physical space, at least a portion of the visual characteristic emitting or reflecting light with a wavelength outside a range of 390 nanometers to 700 nanometers, the image capture device being capable of capturing the at least a portion of the visual characteristic;

determine, based at least in part on the visual characteristic, first information in a virtual space that corresponds to the physical mat;

obtain second information, the second information including a position and orientation of a physical object located in the second physical space;

determine, based at least in part on the first information and the second information, third information that includes a position and orientation in the virtual space corresponding to the position and orientation of the physical object in the second physical space; and render, via the optical see-through display device, a digital object representing the physical object, the digital object at least partially occluding a view of the physical mat at a position and orientation in accordance with the third information.

2. The system of claim 1, wherein the visual characteristic is a fiducial marker.

3. The system of claim 1, wherein the physical mat includes a three-dimensional feature that affects the position and orientation of the digital object in the virtual space.

4. The system of claim 1, wherein a portion of the physical mat that extends beyond a field of view of a display of the optical see-through display device is visible within a field of view of a user of the optical see-through display device.

5. The system of claim 1, wherein the second information is received by the system from a third party that does not control the system.

6. The system of claim 1, wherein the executable instructions that cause the cause the system to determine the first information include instructions that cause the system to determine, from a registry data store, a type of physical mat from a plurality of types of physical mats as the information that corresponds to the visual characteristic.

7. A computer-implemented method, comprising:

determining, from an image of a physical space captured by an image capture device, a visual characteristic on a physical surface in the physical space, the physical surface including a first area inside the visual characteristic and a second area outside of the visual characteristic, the visual characteristic emitting or reflecting light with a wavelength outside a range of 390 nanometers to 700 nanometers, the image capture device being capable of capturing the at least a portion of a visual characteristic;

determining, based at least in part on the visual characteristic, a first region of virtual space that corresponds to the first area and a second region of virtual space that corresponds to the second area;

determining, based at least in part on the visual characteristic, information that includes a position and orientation of a digital object relative to the first region and the second region in the virtual space; and rendering the digital object at a position and orientation in the virtual space in accordance with the information.

8. The computer-implemented method of claim 7, wherein determining the information is further based at least in part on a motion associated with the digital object.

9. The computer-implemented method of claim 7, wherein determining the information includes, on condition that a motion of the digital object would place the digital object in the second region, determining the position and orientation of the digital object to be within the first region.

10. The computer-implemented method of claim 7, wherein a field of view of a user incorporates a larger view of the physical surface than does a field of view of a display of a viewing device being viewed by the user.

11. The computer-implemented method of claim 7, wherein determining the information further includes determining the information further based at least in part on another physical surface located relative to the physical surface.

12. The computer-implemented method of claim 11, wherein:

the method further comprises determining, based at least in part on another visual characteristic in the image, that the other physical surface is present the first physical space; and determining the information is further based at least in part on a position and orientation of the other physical surface relative to the physical surface.

13. A non-transitory computer-readable storage medium having stored thereon executable instructions that, if executed by one or more processors of a computer system, cause the computer system to at least:

obtain, via an image capture device, an image of a physical space;

identify a position and orientation of a physical surface in the physical space, the physical surface comprising a first area and a second area;

determine a virtual space corresponding to a volume in the physical space that is proximate to the physical surface, the virtual space comprising a first region corresponding to the first area and a second region corresponding to the second area;

determine, based at least in part on a visual characteristic of the physical surface, information that includes a position and orientation relative to the first region and the second region in the virtual space, the visual characteristic emitting or reflecting light with a wavelength outside a range of 390 nanometers to 700 nanometers, the image capture device being capable of capturing the at least a portion of a visual characteristic; and render a digital object in a display at the position and orientation in the virtual space to overlay a view of the physical space.

14. The non-transitory computer-readable storage medium of claim 13, wherein:

the executable instructions further cause the computer system to determine that the physical surface is imprinted with a fiducial marker; and the executable instructions that cause the computer system to identify the position and orientation of the physical surface cause the computer system to identify the position and orientation of the physical surface based at least in part on the fiducial marker.

15. The non-transitory computer-readable storage medium of claim 13, wherein the executable instructions that cause the computer system to render the digital object causes the computer system to render the digital object to at least partially occlude a view of the physical space.

16. The non-transitory computer-readable storage medium of claim 13, wherein:

the executable instructions further cause the computer system to:

obtain an image of the physical surface; and detect, within the image, the visual characteristic on the physical surface; and the executable instructions that cause the computer system to identify the position and orientation of the physical surface cause the computer system to identify the position and orientation of the physical surface based at least in part on the visual characteristic.

17. The non-transitory computer-readable storage medium of claim 13, wherein:
the executable instructions further cause the computer system to determine that another physical surface is present in the physical space; and
the executable instructions that cause the computer system to determine the information further cause the computer system to determine the information based at least in part on a position and orientation of the other physical surface relative to the physical surface.

18. The non-transitory computer-readable storage medium of claim 13, wherein the display is a wearable display device.

19. The non-transitory computer-readable storage medium of claim 18, wherein the display is at least partially transparent and allows light from a source external to the display to pass through to an eye of a user of the display.

20. The non-transitory computer-readable storage medium of claim 13, wherein the physical surface is a representation of another physical surface separate from the physical surface.

21. The non-transitory computer-readable storage medium of claim 20, wherein:
the executable instructions further cause the computer system to obtain other information associated with the other physical surface; and
the executable instructions that cause the computer system to determine the information further include instructions that cause the computer system to determine the information based at least in part on the other information.

\* \* \* \* \*